US012653146B2

(12) United States Patent (10) Patent No.: US 12,653,146 B2

Laramore (45) Date of Patent: Jun. 16, 2026

(54) HYDRAULIC OPERATED SQUEEZE CHUTE

(71) Applicant: Austin Laramore, Granbury, TX (US)

(72) Inventor: Austin Laramore, Granbury, TX (US)

(73) Assignee: Austin Laramore, Brock, TX (US)

( * ) Notice: Subject to any disclaimer, the term of this patent is extended or adjusted under 35 U.S.C. 154(b) by 5 days.

(21) Appl. No.: 18/839,716

(22) PCT Filed: Feb. 17, 2023

(86) PCT No.: PCT/US2023/062870

§ 371 (c)(1),
(2) Date: Aug. 19, 2024

(87) PCT Pub. No.: WO2023/159215

PCT Pub. Date: Aug. 24, 2023

(65) Prior Publication Data

US 2025/0169468 A1 May 29, 2025

Related U.S. Application Data

(60) Provisional application No. 63/311,192, filed on Feb. 17, 2022.

(51) Int. Cl.
A01K 1/06 (2006.01)

(52) U.S. Cl.
CPC .................................. A01K 1/0613 (2013.01)

(58) Field of Classification Search
CPC ...... A01K 1/06; A01K 1/0613; A01K 1/0606; A01K 1/062; A01K 1/064; A01K 1/12
See application file for complete search history.

(56) References Cited

U.S. PATENT DOCUMENTS

| | | | | |
|---|---|---|---|---|
| 3,115,670 A | * | 12/1963 | Hlavacek | .................. A22B 5/02 |
| 4,055,148 A | * | 10/1977 | Brockman | ............. A01K 15/00 |
| | | | | 119/103 |
| 9,578,852 B1 | * | 2/2017 | Riley | ..................... A01K 15/04 |
| 10,779,506 B1 | | 9/2020 | Ulrich | |
| 2003/0140870 A1 | * | 7/2003 | Daniels | .................. A01K 15/04 |
| | | | | 119/752 |
| 2005/0132978 A1 | | 6/2005 | Bentz | |
| 2015/0264889 A1 | * | 9/2015 | Beavers | .................. A01K 1/06 |
| 2018/0042200 A1 | | 2/2018 | Gipson | |
| 2019/0297840 A1 | * | 10/2019 | Coulter | ................... A01K 1/06 |
| 2021/0360897 A1 | * | 11/2021 | Wilson | ..................... A01K 1/08 |

OTHER PUBLICATIONS

Internation Search Report and Written Opinion in Related PCT Application: PCT/US23/062870, 6 Pages.

* cited by examiner

*Primary Examiner* — Joshua J Michener
*Assistant Examiner* — Henry Hooper Mudd
(74) *Attorney, Agent, or Firm* — Whitaker Chalk Swindle & Schwartz PLLC; Enrique Sanchez, Jr.

(57) ABSTRACT

A remote operating squeeze chute includes a frame having one or more gates and side members configured to move in a manner to allow animals to enter into and out of the frame. The side members help secure or squeeze the animals when within the frame. A control unit is included to allow an operator to regulate the functions of the chute. A power collection system and air collection system are included. The power collection system permits power to be collected and stored remotely for operation of the chute in rural areas.

20 Claims, 4 Drawing Sheets

HYDRAULIC OPERATED SQUEEZE CHUTE

TECHNICAL FIELD

The present application relates generally to livestock equipment, and more particularly to a 12 Volt hydraulic squeeze chute for working livestock.

DESCRIPTION OF THE PRIOR ART

Livestock are found on an innumerable number of farms in the world. Periodically farmers and ranchers bring the livestock together to work them in an effort to assess their health, inspect them, and provide treatment. Working facilities include one or more pens and alleys that lead the livestock to a squeeze chute. The squeeze chute is configured to squeeze the livestock snuggly from the sides to immobilize them and allow the user safe access to the animal. These chutes are operated mechanically or via hydraulics. Many require the use of a 220 volt hook up or a generator to power the functions of the chute. The need for electricity is often a large hinderance as it restricts the locations and potential uses of the squeeze chute.

Although strides have been made, shortcomings remain. It is desired that an assembly be provided that is not confined to traditional electrical needs and improves the functions of the existing chutes.

SUMMARY OF THE INVENTION

It is an object of the present application to provide an operative livestock squeeze chute in remote areas without remote power sources. The chute will include a power system and an air collection system to assist in operation of the gates and functions of the chute. The need of hydraulics will be minimized wherein compressed air may be used for much of the functions of the chute. The power collection system is configured to capture energy through one or more methods and store such power for use in remote areas where the power grid is not accessible.

It is also an object of the present application to provide a chute that is configured to operate through a wireless controller integrated within a control unit. The wireless controller would allow an operator to be remote from the chute and still regulate the functions thereof.

The more important features of the assembly have thus been outlined in order that the more detailed description that follows may be better understood and to ensure that the present contribution to the art is appreciated. Additional features of the system will be described hereinafter and will form the subject matter of the claims that follow.

Many objects of the present assembly will appear from the following description and appended claims, reference being made to the accompanying drawings forming a part of this specification wherein like reference characters designate corresponding parts in the several views.

Before explaining at least one embodiment of the system in detail, it is to be understood that the assembly is not limited in its application to the details of construction and the arrangements of the components set forth in the following description or illustrated in the drawings. The assembly is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present assembly. It is important, therefore, that the claims be regarded as including such equivalent constructions insofar as they do not depart from the spirit and scope of the present assembly.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figures 1, 2:
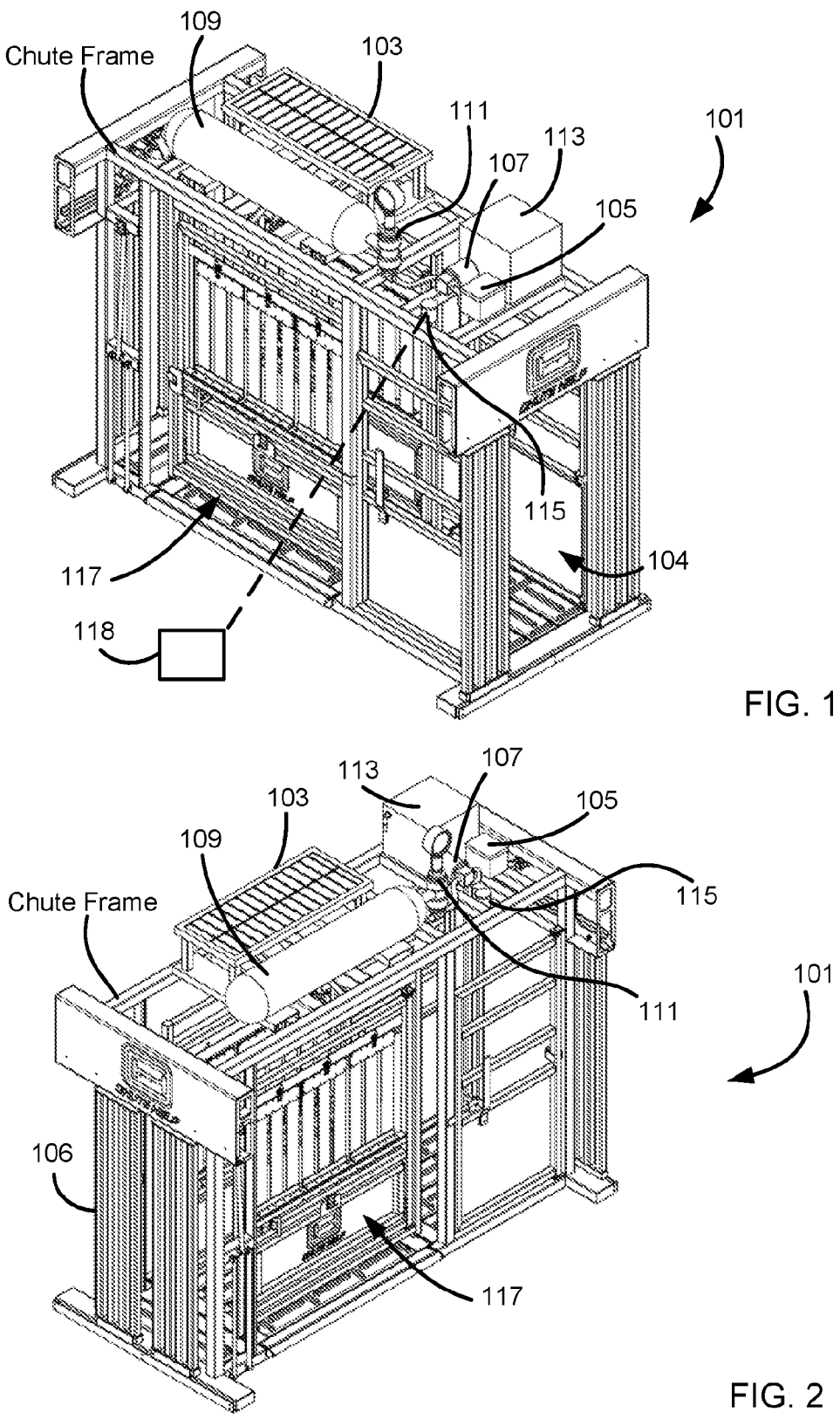
FIG. 1 is a rear perspective view of a hydraulic operated squeeze chute according to an embodiment of the present application.
FIG. 2 is a front perspective view of the hydraulic operated squeeze chute of FIG. 1.

While the assembly of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The hydraulic operated squeeze chute of the present application is configured to utilize an alternate power source than conventional systems with 220-volt plugs. The present system is portable in that it can be located anywhere without respect to electrical power plug needs or the use of large generators. The chute system is designed to eliminate an outside source of electricity, and/or use compressed air to remotely operate the squeeze chute. The system is designed to use a 12-volt system and an air accumulator for energy storage.

The assembly will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe the assembly of the present application and its associated features. With reference now to the Figures, an embodiment of the valve assembly and method of use are herein described. It should be noted that the articles "a", "an", and "the", as used in this specification, include plural referents unless the content clearly dictates otherwise.

Figure 3:
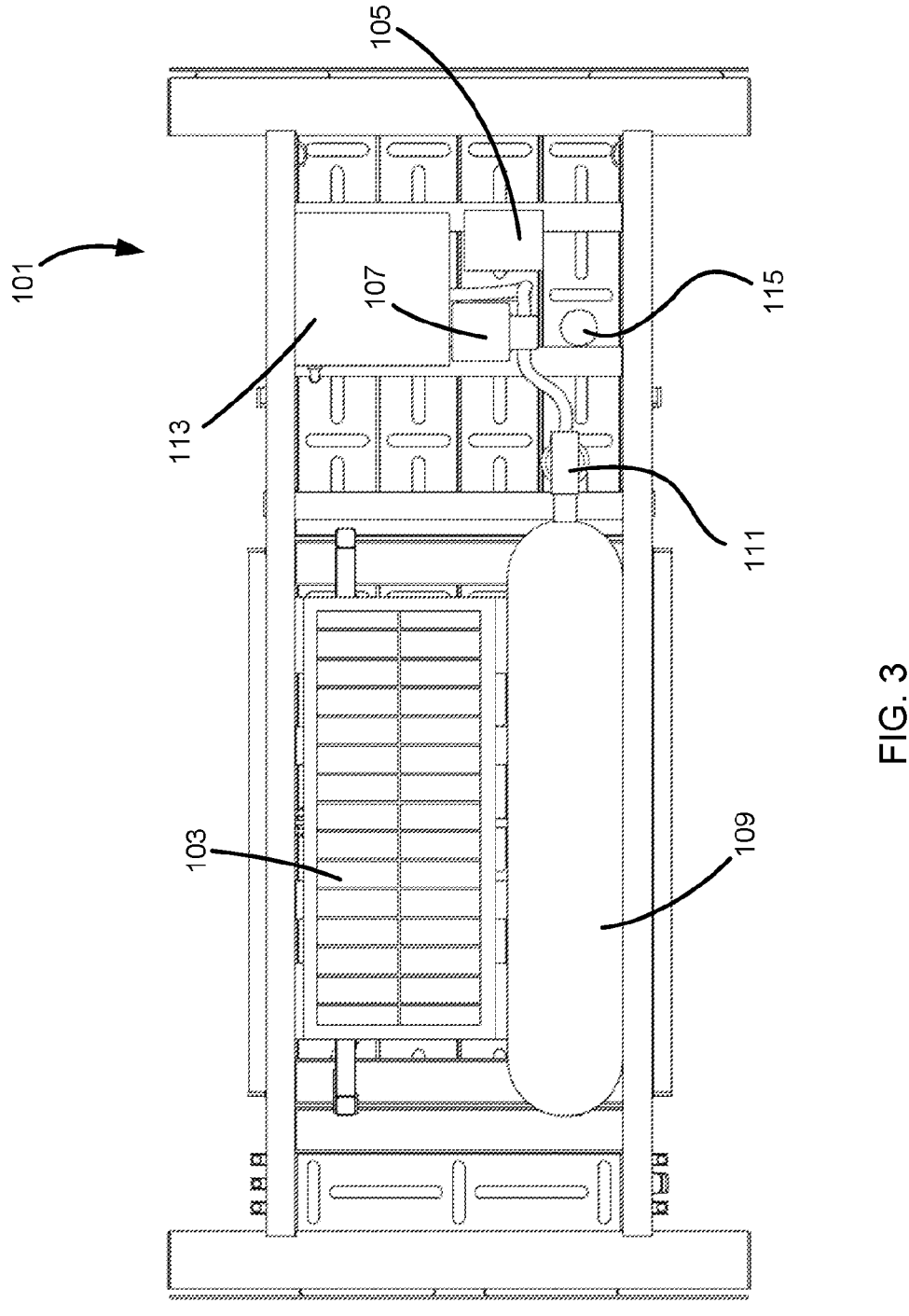
FIG. 3 is a top view of the hydraulic operated squeeze chute of FIG. 1.

Referring now to FIGS. 1-3 in the drawings, a hydraulic operated squeeze chute system 101 is provided. System 101 is a squeeze chute system similar to those found in the art to handle and check livestock on a farm/ranch. FIG. 1 shows a rear perspective view of system 101. An operable rear gate 104 is located at the rear to allow for the entry of livestock. Automated doors are actuatable at the rear entrance to selectively allow an operator to open and close as needed to permit entry and restrict exiting of the livestock. The animal then is permitted to pass therethrough to the headgate.

As seen in FIG. 1 is a control unit 118 which is configured to communicate with the power and air equipment on the roof of system 101. Unit 118 may include one or more switches, levers, buttons, or any type of user interface which permits a user to operate any one of the operable functions of the chute as described herein. Unit 118 is explicitly shown in FIG. 1 but is left out of the remaining figures for clarity purposes.

FIG. 2 in particular shows the front perspective view of system 101. The headgate 106 or head catch functions to secure around the neck of the livestock to help restrict its movement. The headgate 106 has operable open and close doors operable through system 101 much like the rear entrance doors. Each of gates 104/106 are operable through unit 118. The sides of the squeeze chute are configured to selectively squeeze the sides of the livestock once in the headgate. This acts to further stabilize the livestock and restrict movement to help ensure the safety of the animal. Additionally, this helps to increase safety for the operator as they work around the livestock and administer care.

It is understood that the overall functions of chute system 101 are similar to other conventional chutes in purpose and design except for areas as noted herein. The squeeze function of the system 101 may include parallel translating side member movement wherein the sides of the chute translate parallel to one another into and away from the center of the chute. Alternatively, the side members of the chute may initiate the squeeze function through a V-configuration wherein the base of the side members pivots along a point near the floor of the chute and rotates to or away from the center at the upper portion of the side member.

As noted previously, system 101 is configured to eliminate outside sources of electricity from being required to operate. The need for 220-volt systems are done away. System 101 is configured to operate with a 12-volt system. System 101 includes an electrical collection system to produce and store power as well as an air collection system (i.e. air accumulator system) for the storage of pressurized air for the purpose of operating the powered functions of the chute system. Long extension cords, noisy generators, and being tied down to a power outlet are removed. System 101 is configured to capture/collect its own power and store it through one or more battery systems. This power is then used to run air collection equipment wherein the air replaces conventional hydraulics for the operation of the gates and chute in general.

The electrical system is a 12-volt system and may utilize a solar panel 103 to collect power. Panel 103 is connected to a battery 105 for the storage of solar power. The chute system 101 draws power from the battery 105 and/or directly from panel 103 to selectively operate an electric pump 107 configured to pressurize air within the air accumulator system. Air is pressurized into an air accumulator 109 and stored for use in operating the doors and functions of the system. A pressure gauge 111 is used to monitor and set pressure levels. A reservoir 113 is useful to supplement air needs of the accumulator 109. One or more solenoids 115 are used to actuate and operate system 101. Operation of unit 118 regulates the movements of gates 104/106 and the side members.

FIG. 3 is a top view of the above components located on top of the chute frame. This location allows for minimal intrusion into operator work areas and minimizes any dimensional adjustments over conventional chutes.

In operation, system 101 is powered on and the 12-volt pump 107 fills accumulator 109. Once the desired pressure is reached, pump 107 turns off. Pump 107 selectively turns on/off to maintain sufficient pressure in accumulator 109 to operate system 101. As a livestock enters the back of the chute, a lever or button may be engaged thereby activating the hydraulic system. The gates are closed or opened as needed. The back gate function, squeeze function, and head catch function are all operated through one or more levers/buttons. The system may include a wireless controller/remote option to operate the various functions. The system will operate under no more than 200 lbs of pressure. The wireless controller feature of unit 119 allows a user to potentially access and control the functions of system 101 via a remote electronic device such as a cell phone or tablet.

Figure 4:
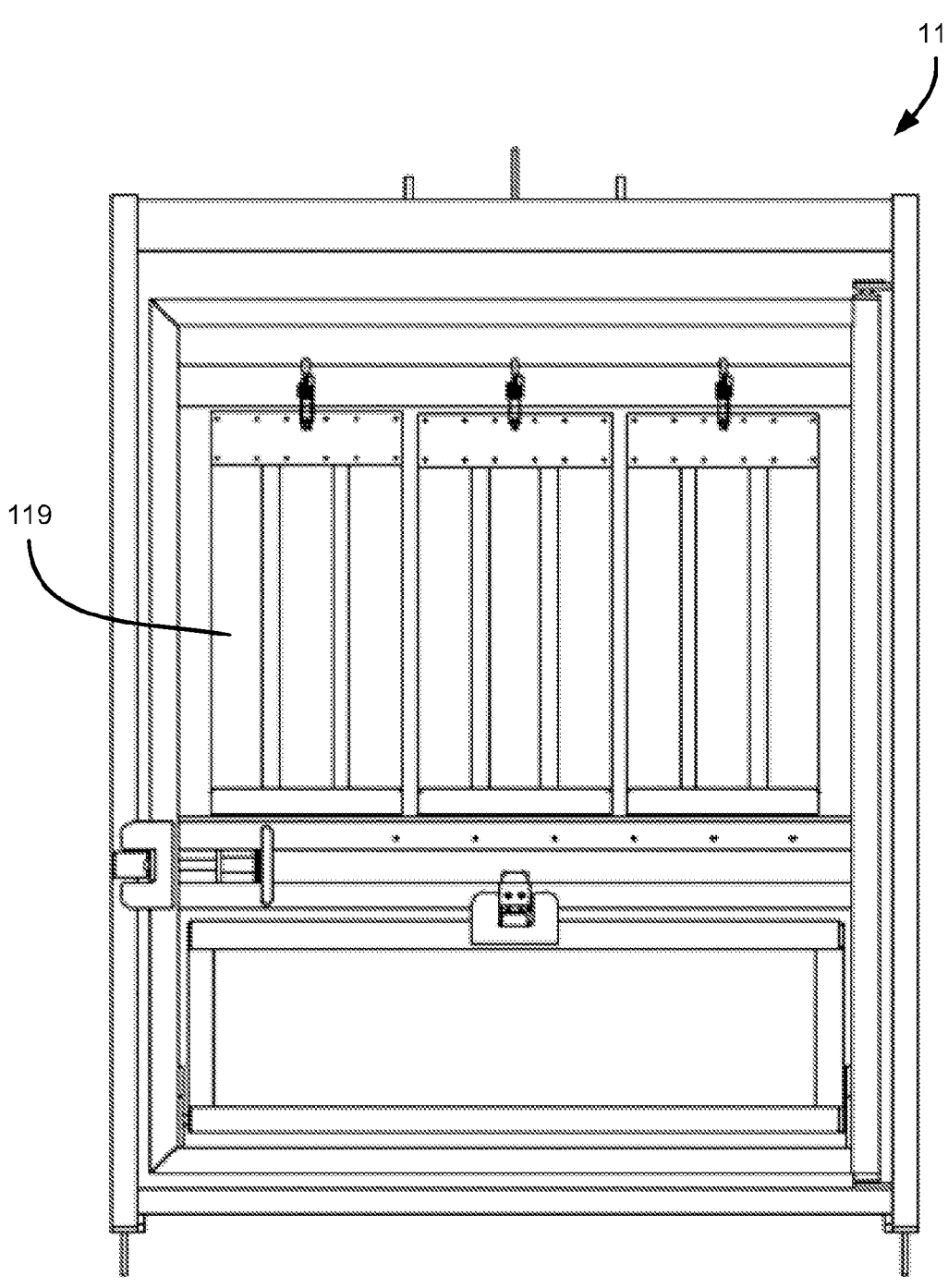
FIG. 4 is a side view of a side member in the hydraulic operated squeeze chute of FIG. 1.

Referring now also to FIG. 4 in the drawings, a side member 117 of chute system 101 is shown. As noted, members 117 on one or both sides of chute frame may translate toward and/or away from one another to help secure and stabilize the livestock. The sides of the chute are adjustable to narrow down to the desired size of the animal. System 101 may use either a "V-Squeeze" style or "Parallel Squeeze" function to provide this feature. Also included in members 117 are a series of belting "drop down" members 119 that act as a cushion and conform to the animal's sides during the process of squeezing, making it less stressful on the animal. Typical hard metal or aluminum members form isolated pressure points on the livestock and are less desirable. Members 119 are clipped at the top area and have flexible center straps. An operator can easily clip or loosen members 119 to provide access when needed.

The 12-volt power over hydraulic system utilizing the air accumulator as an energy storage bank is an advancement beyond conventional systems. This in combination with the method used to adjust the sides of the "squeeze function" for different sizes of cattle/calves helps to improve livestock comfort and safety. The belting inside of the squeeze used to conform to the livestock's size, instead of steel.

Figure 5:
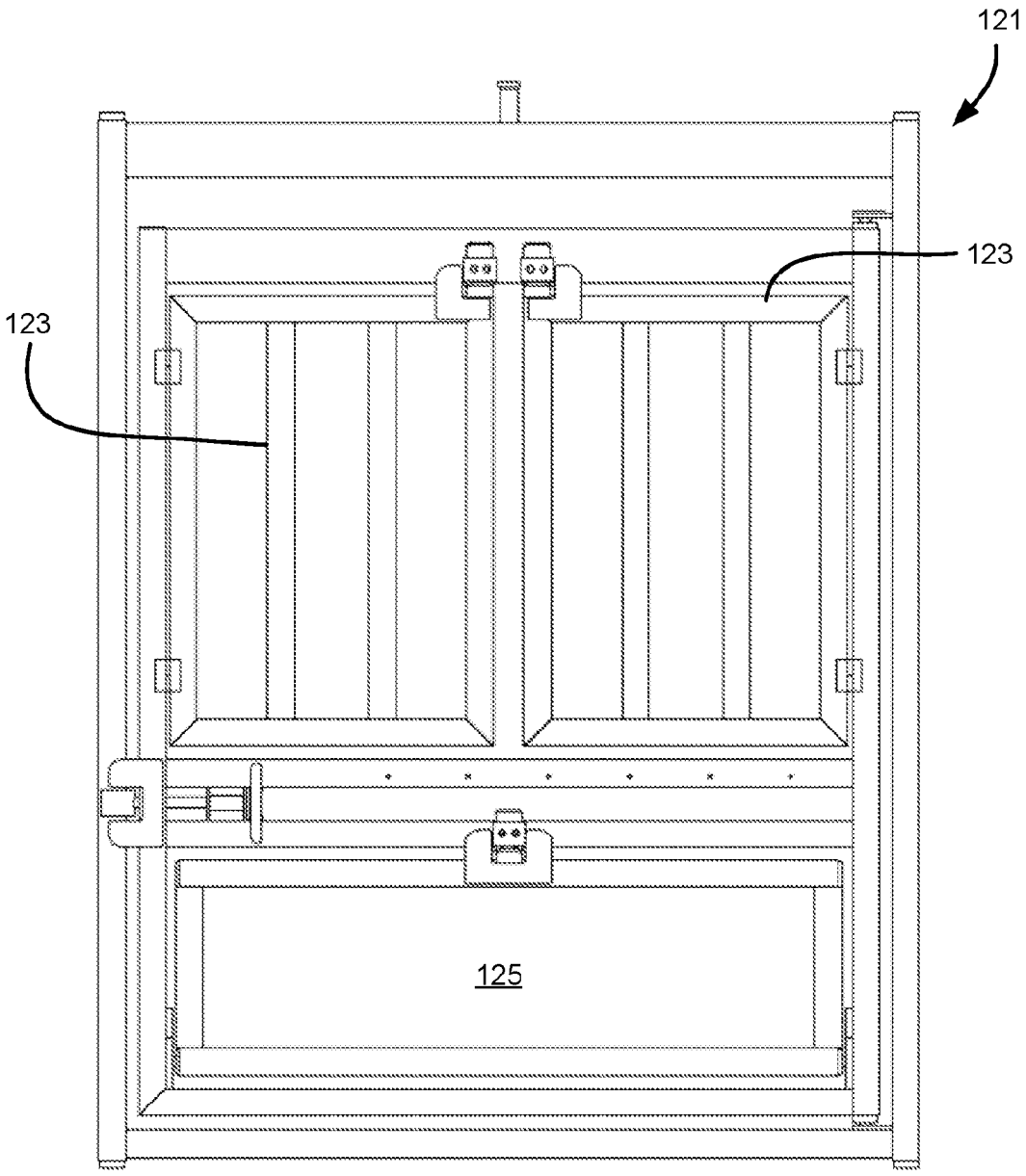
FIG. 5 is a side view of an alternate side member in the hydraulic squeeze chute of FIG. 1.

Referring now also to FIG. 5 in the drawings, a view of an alternate side member 121 is shown. Side member 121 is similar in form and function to side member 117 except as noted herein. Member 121 replaces belting members 119 with rigid material side doors 123 not configured to flex like belting. Doors 123 are manually operated between an open and closed position. A lower door 125 is also shown to allow access to the feet of the animals. Manual latches are used to selectively secure the doors 123/125 in place.

The current application has many advantages over the prior art including at least the following: (1) This system will allow users the advantage of being able to take their product anywhere and it will still function like a hydraulic chute, whereas before operators had to have an electrical hook up or use a manual/hand operated chute. System 101 allows the chutes to be more portable. (2) It also may include a wireless controller integrated within unit 119. (3) The side drop down members doors may be made of belting to help conform to the sides of the animal to keep stress levels down. (4) The squeeze function (sides) are adjustable using a "pry bar" that is a unique device.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A squeeze chute for an animal, comprising:
a frame having a front opening and a rear opening;
a rear gate covering the rear opening and a front gate covering the front opening;
a plurality of side members coupled to the frame, wherein the plurality of side members is configured to selectively translate relative to one another so as to restrict a volume within the frame, wherein the plurality of side members comprises a first side member and a second side member, further wherein the first side member includes a first plurality of belting members configured to conform to a first side of the animal, and further wherein the second side member includes a second plurality of belting members configured to conform to a second side of the animal;
an electrical collection system configured to capture or collect and store electrical power;
an air collection system configured to receive power from the electrical collection system, the air collection system configured to pressurize a volume of air and selectively release the pressurized volume of air; and
a control unit configured to regulate operation of the rear gate and front gate, the control unit in communication with the electrical collection system and the air collection system, the rear gate and the front gate operable via compressed air.

2. The chute of claim 1, wherein the electrical collection system includes a solar panel.

3. The chute of claim 1, wherein the air collection system includes an accumulator to hold pressurized air.

4. The chute of claim 3, further comprising one or more solenoids configured to actuate the front gate and the rear gate.

5. The chute of claim 1, wherein the control unit is further configured to regulate the plurality of side members to apply a v-squeeze on the animal.

6. The chute of claim 1, wherein the control unit is further configured to regulate the plurality of side members to apply a parallel squeeze on the animal.

7. The chute of claim 1, wherein the first and second plurality of belting members are free of hard metal or aluminum material.

8. The chute of claim 1, wherein the first and second plurality of belting members comprises a flexible center strap connecting a top portion of each belting member to the respective side member.

9. The chute of claim 1, wherein the control unit includes a wireless controller.

10. The chute of claim 1, wherein the electrical collection system comprises a 12-volt power system.

11. The chute of claim 1, wherein the control unit is further configured to selectively rotate the frame in a first direction and a second direction.

12. A squeeze chute for an animal, comprising:
a frame having a front opening and a rear opening;
a rear gate covering the rear opening and a front gate covering the front opening;
a first side member and a second side member coupled to the frame, wherein the first and second side members are configured to selectively translate relative to one another so as to restrict a volume within the frame, further wherein the first side member includes a first plurality of belting members configured to conform to a first side of the animal, and further wherein the second side member includes a second plurality of belting members configured to conform to a second side of the animal;
an electrical collection system configured to capture or collect and store electrical power;
an air collection system configured to receive power from the electrical collection system, the air collection system configured to pressurize a volume of air and selectively release the pressurized volume of air; and
a control unit configured to regulate operation of the rear gate and front gate, the control unit in communication with the electrical collection system and the air collection system, the rear gate and the front gate operable via compressed air, wherein the control unit is further configured to selectively rotate the frame in a first direction and a second direction, further wherein the first side member is substantially parallel to a surface supporting the frame when the frame is rotated in the first direction, and further wherein the second side member is substantially parallel to the surface supporting the frame when the frame is rotated in the second direction.

13. The chute of claim 12, wherein the electrical collection system includes a solar panel.

14. The chute of claim 12, further comprising one or more solenoids configured to actuate the front gate and the rear gate, wherein the air collection system includes an accumulator to hold pressurized air.

15. The chute of claim 12, wherein the control unit is further configured to regulate the first and second side members to apply a v-squeeze on the animal.

16. The chute of claim 12, wherein the control unit is further configured to regulate the first and second side members to apply a parallel squeeze on the animal.

17. The chute of claim 12, wherein the first and second plurality of belting members are free of hard metal or aluminum material.

18. The chute of claim 12, wherein the first and second plurality of belting members comprises a flexible center strap connecting a top portion of each belting member to the respective side member.

19. The chute of claim 12, wherein the control unit includes a wireless controller.

20. The chute of claim 12, wherein the electrical collection system comprises a 12-volt power system.

* * * * *